(12) United States Patent
Miller et al.

(10) Patent No.: US 11,499,442 B2
(45) Date of Patent: Nov. 15, 2022

(54) BEARING COMPARTMENT SEAL CONFIGURATION FOR A GAS TURBINE ENGINE

(71) Applicant: United Technologies Corporation, Farmington, CT (US)

(72) Inventors: Jonathan Logan Miller, Belchertown, MA (US); M. Rifat Ullah, East Hartford, CT (US)

(73) Assignee: Raytheon Technologies Corporation, Farmington, CT (US)

(*) Notice: Subject to any disclaimer, the term of this patent is extended or adjusted under 35 U.S.C. 154(b) by 320 days.

(21) Appl. No.: 16/383,018

(22) Filed: Apr. 12, 2019

(65) Prior Publication Data

US 2020/0325788 A1    Oct. 15, 2020

(51) Int. Cl.
| | | |
|---|---|---|
| *F01D 11/00* | (2006.01) | |
| *F04D 29/12* | (2006.01) | |
| *F16J 15/44* | (2006.01) | |
| *F01D 11/02* | (2006.01) | |
| *F01D 25/18* | (2006.01) | |

(52) U.S. Cl.
CPC .......... *F01D 11/003* (2013.01); *F01D 11/025* (2013.01); *F01D 25/183* (2013.01); *F04D 29/122* (2013.01); *F16J 15/441* (2013.01); *F05D 2220/32* (2013.01); *F05D 2240/581* (2013.01); *F05D 2300/50211* (2013.01)

(58) Field of Classification Search
CPC ...... F01D 11/003; F01D 25/16; F01D 25/183; F01D 11/025; F04D 29/122; F02C 7/06; F02C 7/28; F05D 2240/58; F05D 2240/581; F05D 2240/55; F05D 2300/5021; F05D 2300/50211; F05D 2300/50212; F16J 15/44; F16J 15/441; F16J 15/442
See application file for complete search history.

(56) References Cited

U.S. PATENT DOCUMENTS 6,322,081 B1    11/2001   Ullah et al.
10,927,960 B2 *  2/2021   Bernacchi ............ F16J 15/3464
(Continued)

FOREIGN PATENT DOCUMENTS

DE    102009054007 A1 *  5/2011  ............... F02C 7/28
EP    2977562           1/2016
(Continued)

OTHER PUBLICATIONS

English Machine translation of DE 10 2009 054 007, Jun. 20, 2021.*
(Continued)

*Primary Examiner* — Christopher Verdier
(74) *Attorney, Agent, or Firm* — Carlson, Gaskey & Olds, P.C.

(57) ABSTRACT

A bearing compartment seal for a gas turbine engine includes at least one seal ring defining an axis and having a radially inward facing sealing surface and a seal runner having a support constructed of a first material and an interface portion constructed of a second material. The interface portion includes a radially outward facing surface. A first coefficient of thermal expansion of the second material is at most approximately equal to a second coefficient of thermal expansion of the at least one seal ring.

18 Claims, 7 Drawing Sheets

(56) References Cited

U.S. PATENT DOCUMENTS

| | | | |
|---|---|---|---|
| 10,935,142 B2* | 3/2021 | Bernacchi | F16J 15/441 |
| 2012/0177486 A1* | 7/2012 | Ullah | F16J 15/3464 |
| | | | 415/174.3 |
| 2014/0255148 A1 | 9/2014 | Burns et al. | |
| 2014/0265151 A1 | 9/2014 | Vasagar | |
| 2015/0049968 A1* | 2/2015 | Garrison | F01D 11/04 |
| | | | 384/115 |
| 2016/0032765 A1 | 2/2016 | Shuaib et al. | |
| 2017/0234430 A1 | 8/2017 | Fadgen | |
| 2019/0376402 A1* | 12/2019 | Theratil | F01D 11/06 |
| 2020/0173556 A1* | 6/2020 | Fadgen | F16J 15/324 |
| 2020/0173557 A1* | 6/2020 | Fadgen | F16J 15/26 |
| 2020/0224769 A1* | 7/2020 | Black | F16J 15/44 |

FOREIGN PATENT DOCUMENTS

| | | |
|---|---|---|
| EP | 3208502 | 8/2017 |
| EP | 3660273 | 6/2020 |

OTHER PUBLICATIONS

European Search Report for Application No. 20167053.6 dated Aug. 12, 2020.

* cited by examiner

BEARING COMPARTMENT SEAL CONFIGURATION FOR A GAS TURBINE ENGINE

TECHNICAL FIELD

The present disclosure relates generally to bearing compartment seals for gas turbine engines.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. In some examples, a fan is also connected to the shaft and is driven to rotate via rotation of the turbine as well.

Included within gas turbine engines are multiple bearings which allow relative movement between internal components of the gas turbine engine. The bearings are contained within bearing compartments and in some examples a lubricant, such as oil, is sprayed into the bearing compartment. The lubricant decreases wear and degradation of the bearing (s) contained within the bearing compartment. In order to prevent the lubricant from contacting and negatively impacting engine components adjacent to the bearing compartment, bearing compartment seals are included within the bearing compartment housing.

SUMMARY OF THE INVENTION

In one exemplary embodiment a bearing compartment seal for a gas turbine engine includes at least one seal ring defining an axis and having a radially inward facing sealing surface, a seal runner having a support constructed of a first material and an interface portion constructed of a second material, the interface portion including a radially outward facing surface, and wherein a first coefficient of thermal expansion of the second material is at most approximately equal to a second coefficient of thermal expansion of the at least one seal ring.

In another example of the above described bearing compartment the first coefficient of thermal expansion is approximately identical to the second coefficient of thermal expansion.

In another example of any of the above described bearing compartments the at least one seal ring is constructed of a third material, and wherein the third material and the second material have at least one shared underlying component material.

In another example of any of the above described bearing compartments the third material and the second material are the same material.

In another example of any of the above described bearing compartments the at least one seal ring comprises a pair of seal rings.

In another example of any of the above described bearing compartments the interface portion is disposed circumferentially about the support portion, and extends at least a full axial length of the at least one seal ring.

In another example of any of the above described bearing compartments the interface portion extends a full axial length of the support portion.

In another example of any of the above described bearing compartments the support portion extends less than a full axial length of the interface portion.

In another example of any of the above described bearing compartments the interface portion extends less than a full length of the support portion.

In another example of any of the above described bearing compartments the support portion includes a radially outward extending axial retention tab at at least one axial end of the support portion.

In another example of any of the above described bearing compartments the axial retention tab extends a full radial height of the interface portion.

In another example of any of the above described bearing compartments the axial retention tab extends a full circumference of the support portion.

In another example of any of the above described bearing compartments the axial retention tab is circumferentially intermittent.

In another example of any of the above described bearing compartments the interface portion is retained relative to the support portion at least partially via an interference fit in at least one condition.

In another example of any of the above described bearing compartments wherein the interface portion is retained relative to the support portion at least partially via a fastener.

In one exemplary embodiment a gas turbine engine includes an engine core including a compressor, a combustor fluidly connected to the compressor, and a turbine fluidly connected to the combustor, an engine static structure supported relative to a shaft within the core via at least one bearing system disposed within a compartment, a bearing compartment seal disposed in the bearing compartment, wherein the bearing compartment seal includes at least one seal ring defining an axis and having a radially inward facing sealing surface, a seal runner having a support constructed of a first material and an interface portion constructed of a second material, the interface portion including a radially outward facing surface, and wherein a first coefficient of thermal expansion of the second material is at most approximately equal to a second coefficient of thermal expansion of the at least one seal ring.

In another example of the above described gas turbine engine the at least one seal ring comprises a pair of seal rings, and wherein the pair of seal rings are constructed of a third material, and wherein the third material and the second material have at least one shared underlying component material.

In another example of any of the above described gas turbine engines an exterior radial clearance of the interface portion is less than an internal radial clearance of the at least one seal ring while the engine is in a hot condition.

An exemplary method for minimizing rubbing in a gas turbine engine bearing compartment seal includes defining a seal runner using a distinct seal support and seal interface, wherein a coefficient of thermal expansion of the seal interface is less than or approximately equal to a coefficient of thermal expansion of at least one seal ring disposed radially outward of the seal interface.

Another example of the above described method for minimizing rubbing in a gas turbine engine bearing compartment seal further includes constructing the at least one seal ring of a first material, and constructing the interface portion of a second material including at least some identical constituent materials to the first material.

These and other features of the present invention can be best understood from the following specification and drawings, the following of which is a brief description.

DETAILED DESCRIPTION

Figure 1:
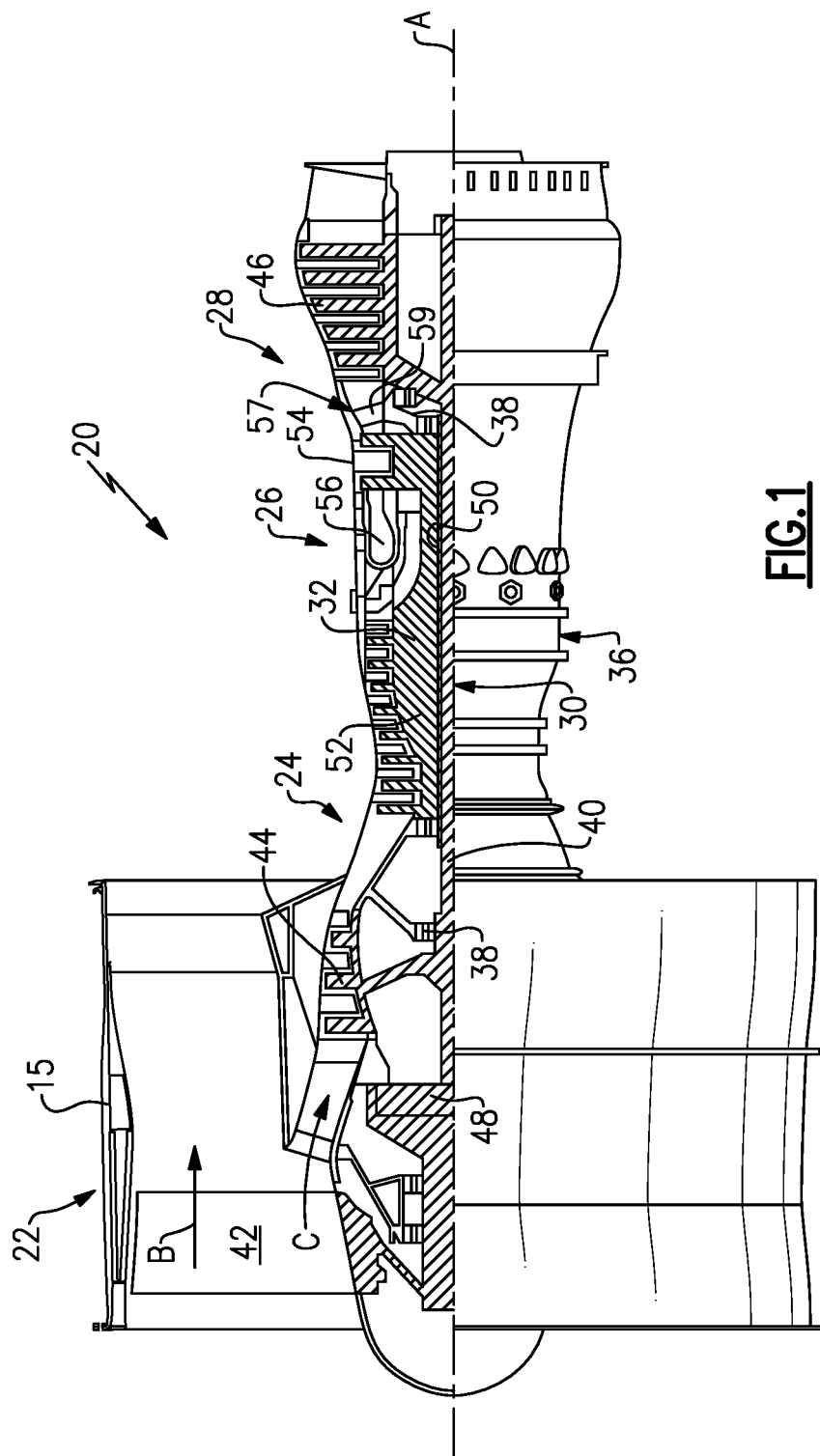
FIG. 1 illustrates a high level schematic view of an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures, direct drive engines, or any other gas turbine engine.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{-0.5}$. The "Low corrected fan tip speed" as disclosed herein according to one non-limiting embodiment is less than about 1150 ft/second (350.5 meters/second).

Figure 2:
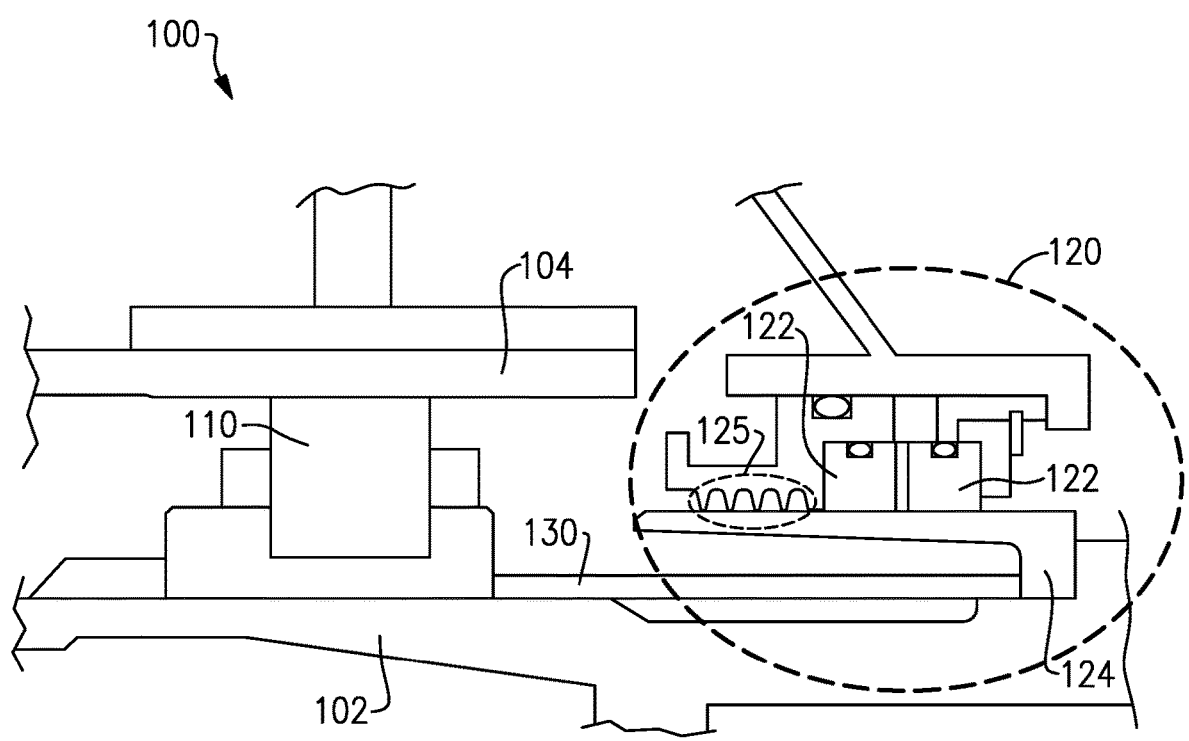
FIG. 2 schematically illustrates a portion of an exemplary bearing compartment for the gas turbine engine of FIG. 1.

With continued reference to FIG. 1, FIG. 2 schematically illustrates a cross section of a portion of a bearing compartment 100 including the bearing systems 38 of FIG. 1. The bearing compartment 100 includes a bearing 110 contacting a shaft 102 and a bearing compartment housing 104. A bearing compartment seal 120 is spaced from the bearing 110 via a spacer 130 and includes a pair of seal rings 122 contacting a seal runner 124. The seal runner 124 is a ring, and is coaxial with the shaft 102. During operation of the gas turbine engine 20, the seal rings 122 remain static, while the runner 124 rotates along with the shaft 102. A seal is formed at the seal 120 by a combination of a knife edge seal portion 125 and the radially inward facing surface of the seal rings 122 and the radially outward facing surface of the seal runner 124. While illustrated as directly contacting each other, it is appreciated that in the cool state, a gap can exist between the radially inward facing surface of the seal rings 122 and the radially outward facing surface of the seal runner 124.

In order to sufficiently handle the physical and thermal stresses on the various components, the seal rings 122 are constructed of a first material, and the seal runner 124 is constructed of at least one second material. The specific materials selected for each of the seal rings 122 and the seal runner 124 are constrained by the wear characteristics, boundary conditions and types of stresses that the corresponding components are exposed to. By way of example, seal rings 122 are typically constructed of graphitic carbon type materials, and have a low coefficient of thermal expansion. In contrast, the seal runners 124 are typically constructed of a metal or other metallic type material and have a high coefficient of thermal expansion.

Figure 4A:
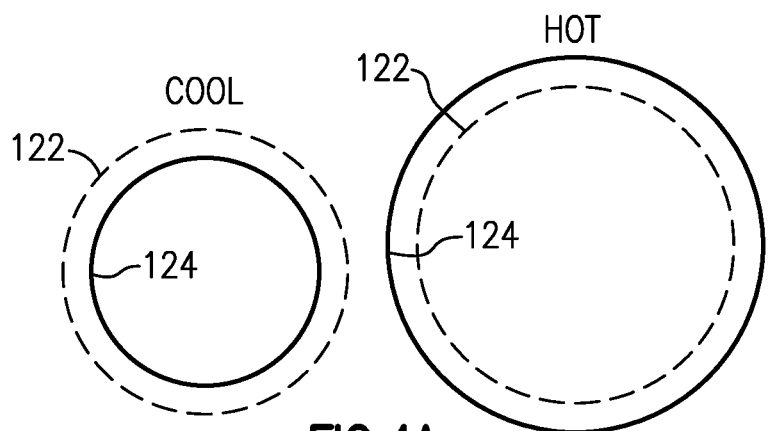
FIG. 4A schematically illustrates a prior art seal configuration in a cool and a hot state.

In existing systems, the disparate materials can result in a thermal growth mismatch between the seal rings 122 and the seal runner 124. Due to the mismatch in material coefficients of thermal expansion, the seal runner 124 expands more than the seal rings 122, resulting in an interference between the seal rings 122 and the seal runner 124 at the contact surface when operating under hot conditions. This mismatch is illustrated in the prior art illustration of FIG. 4A with a schematic prior art seal ring 122 and a schematic prior art seal runner 124. The resultant interference can result in additional seal ring wear, increased leakage through the seal and a decreased lifespan of the seal.

Figure 4B:
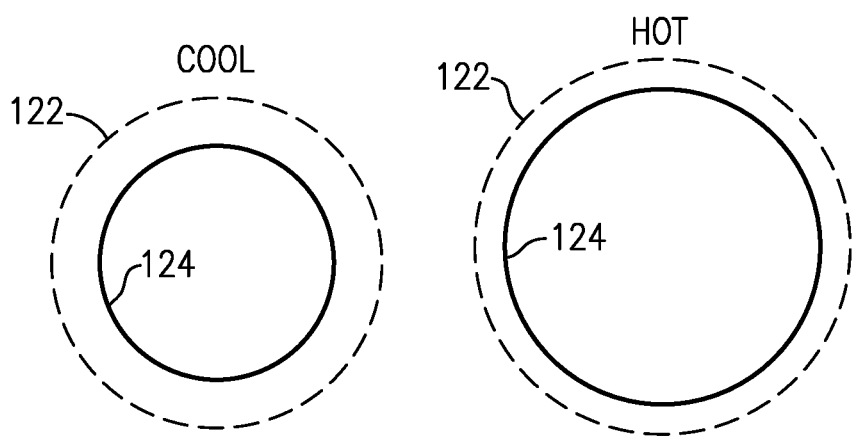
FIG. 4B schematically illustrates another prior art seal configuration in a cool and a hot state.
Figure 4C:
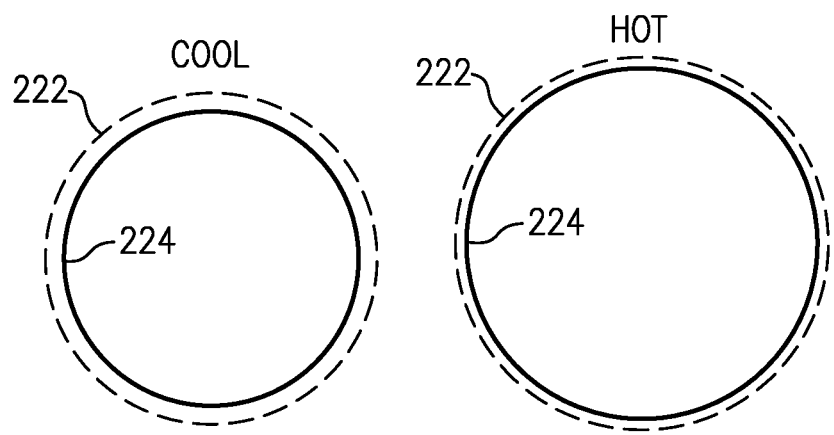
FIG. 4C schematically illustrates a seal configuration according to one of FIGS. 3A-3D in a cool and a hot state.

Mitigating the mismatch by increasing the gap between the radially inward facing surface of the seal rings and the radially outward facing surface of the seal runner 124 during cool conditions could eliminate the interference condition, but would result in an unacceptably large gap and insufficient sealing for some applications. This configuration is illustrated in Prior Art FIG. 4B.

With continued reference to FIGS. 1 and 2, FIGS. 3A-3D illustrate exemplary seal 200 configurations that can be used to seal the bearing compartment 100 of FIG. 2. While illustrated as distinct examples, it is appreciated that any given bearing compartment 100 can include multiple seals, each of which can be any of the seal configurations of FIGS. 3A-3C, and the configurations are not mutually exclusive. In order to mitigate the thermal mismatch described above, while at the same time retaining the structural capabilities of the seal runner 224, the seal runner 224 includes at least two portions, a seal interface 226 and a support 228.

The seal interface 226 presents a radially outward facing surface 240 that acts as a sealing surface. The seal interface 226 is constructed of a material that has approximately the same coefficient of thermal expansion as the seal rings 222. As used herein "approximately the same" refers to a coefficient of thermal expansion that is within 50-150% of the coefficient of thermal expansion of the seal rings 222. The percentage is dependent on specific materials selected for the design and can vary based on the materials. By way of comparison, typical existing coefficient of thermal expansion values are in the range of 200-300% (or more) of the seal rings 222. In some examples, the material of the seal interface 226 is the same as that of the corresponding seal rings 224. In other examples, the seal interface 226 includes some of the same underlying component materials as the corresponding seal rings 224, or entirely different materials having approximately the same coefficient of thermal expansion as the corresponding seal rings 224. Radially inward of the seal interface 226, is a seal support 228. The seal support 228 maintains the axial and radial positioning of the seal interface 226 relative to the seal rings 122, and maintains the connection of the seal interface 226 to the shaft 202. The seal support 228 is constructed of a metallic material, and includes a higher coefficient of thermal expansion than the seal rings 222 and the seal interface 226. Due to the coefficient of thermal expansion matching between the seal interface and the seal rings, the seal interface allows effective radial clearance or gap of the seal rings 222 to be lower, and thus allows for lower leakage and lower wear.

Figure 3A:
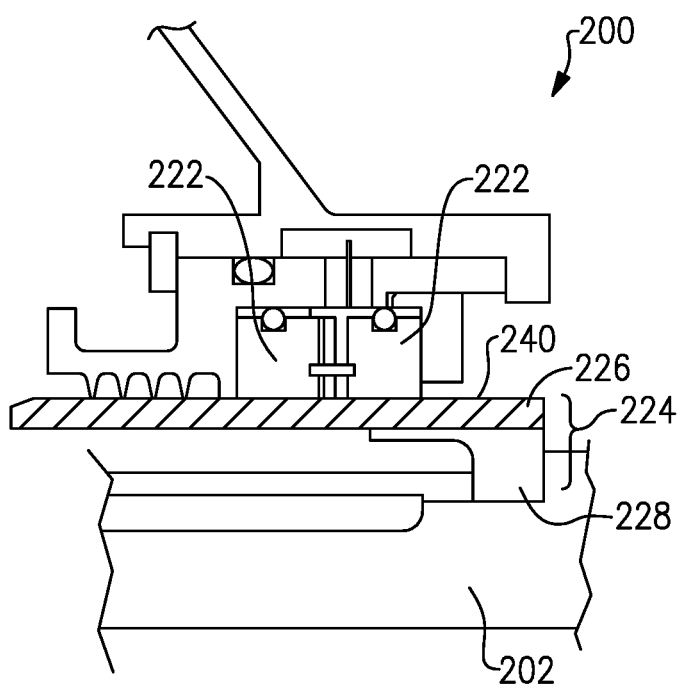
FIG. 3A schematically illustrates one exemplary seal configuration for the bearing compartment of FIG. 2.

With reference now to the example of FIG. 3A specifically, the seal interface 226 can extend a full axial length of the seal 200, with the support 228 extending only a portion of the axial length of the seal 200. In this configuration, the seal interface 226 is maintained in position relative the support 228 via a press fit, or interference fit, configuration. As the bearing compartment 100 including the seal configuration heats up, the seal support 228 expands more than the seal interface 226, and the press fit is strengthened. In alternate examples, the seal interface 226 can be fused to the seal support, or fastened using a fastener.

Figure 3B:
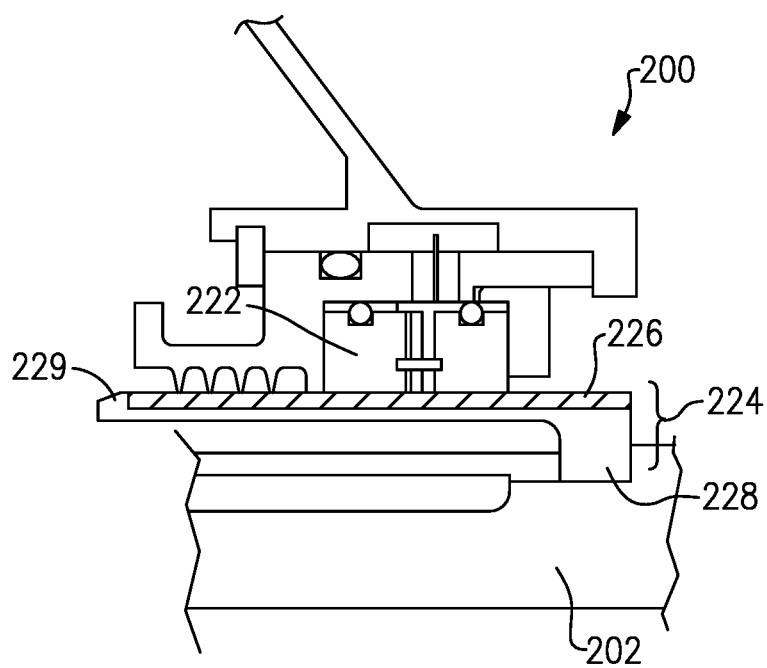
FIG. 3B schematically illustrates one exemplary seal configuration for the bearing compartment of FIG. 2.

With reference now to the example of FIG. 3B, the seal interface 226 extends a majority of the axial length of the seal 200, and abuts an axial positioning tab 229 at an end of the seal. While illustrated as being positioned at the end opposite the connection to the shaft 202, it should be appreciated that the axial positioning tab 229 can alternatively be positioned at the end of the seal runner 224 that is connected to the shaft 202, depending on what direction the seal interface 226 is being loaded onto the seal support 228. In the example of FIG. 3B, the seal interface portion 226 and the support 228 are press fit, as with the example of FIG. 3A, with the press fit maintaining the seal interface 226 in a static position relative to the support 228 and the shaft 202. The axial positioning tab 229 prevents the seal interface 226 from being slid too far as it is being loaded into the runner 224. In the illustrated example, the axial positioning tab 229 is a full radial height of the seal interface 226, and extends a full circumference of the runner 224. In alternative examples the axial positioning tab 229 can extend only part of the radial height of the seal interface 226, can include an intermittency 201 along the circumference (illustrated in the example of FIG. 3E), or both. In the illustrated example, the interface portion 226 includes a uniform radial thickness along a contact with the seal ring.

Figure 3C:
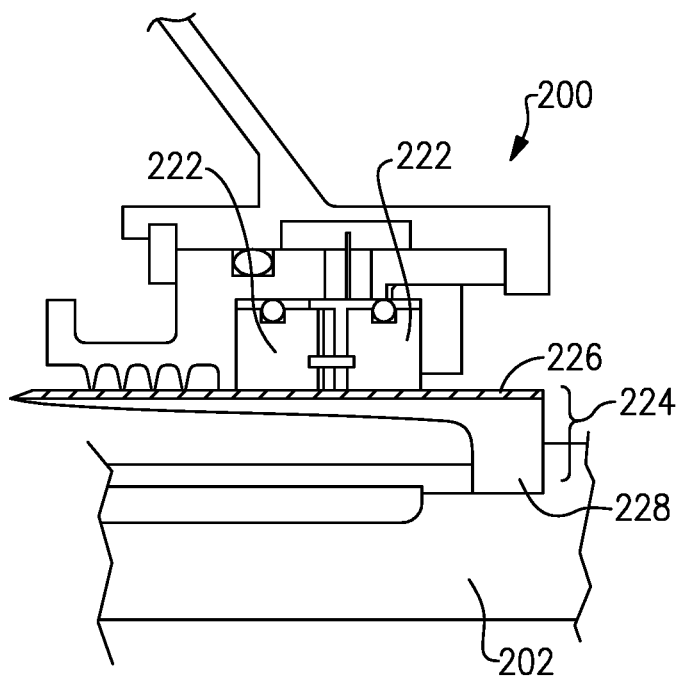
FIG. 3C schematically illustrates one exemplary seal configuration for the bearing compartment of FIG. 2.

With reference now to the example of FIG. 3C, the seal 200 is similar to that of FIG. 3A, however the support 228 is extended the full axial length of the sea runner 224.

Figure 3D:
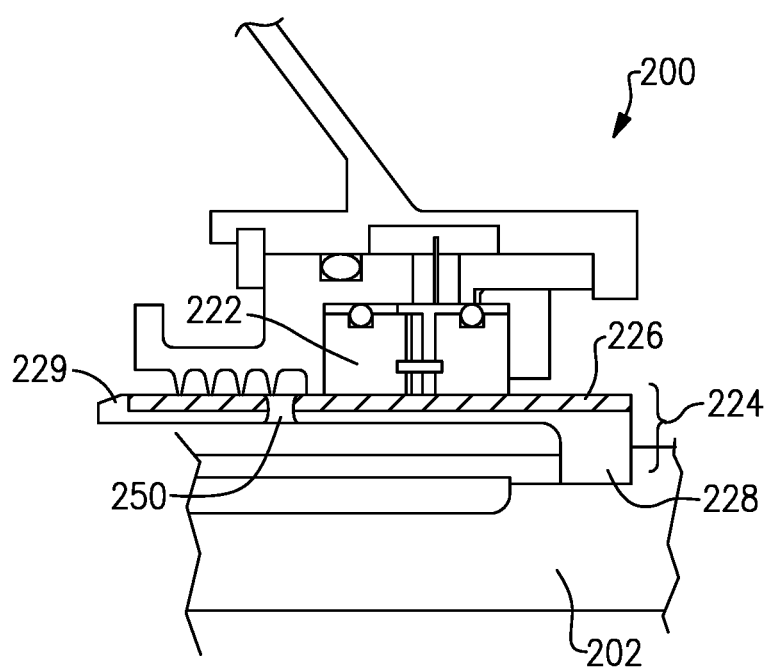
FIG. 3D schematically illustrates one exemplary seal configuration for the bearing compartment of FIG. 2.
Figure 3E:
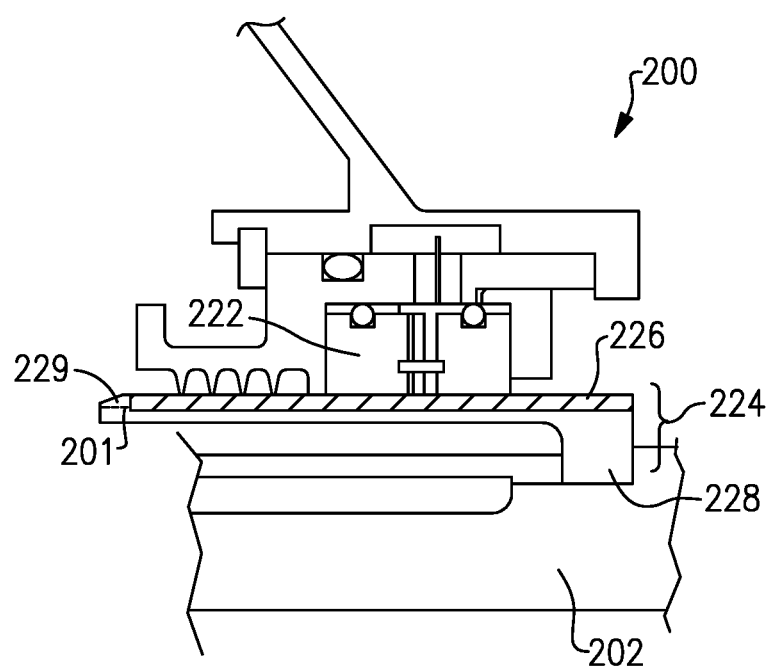
FIG. 3E schematically illustrates one exemplary seal configuration for the bearing compartment of FIG. 2.

With reference now to the example of FIG. 3D, the seal 200 is similar to that of FIG. 3B with the addition of a fastener connection 250 protruding through the seal interface 226 and the seal support 228. The fastener connection 250 further assists in maintaining the interface 226 and the support 228 static relative to each other, and the shaft 202. While illustrated in conjunction with the tab 229, it is appreciated that the fastener connection 250 can be included in any of the example configurations of FIGS. 3A-3C, and can be included at alternate axial positions.

With reference now to all of FIGS. 3A-3C, FIG. 4C schematically illustrates the relative sizing of the seal rings 222 and the contact surface formed by the interface portion 226 of the seal runner 224. The example of FIG. 4C allows you to size the gaps smaller between parts during cold conditions, which allows for greater control of oil loss from the bearing compartment and lower air flow amounts than the prior art example of FIG. 4B. In addition, the example of FIG. 4C allows for the achievement of smaller gaps between parts while in the hot condition as compared to the prior art example of FIG. 4B. Achieving smaller hot condition gaps will permit or enable lower air flow amounts and improved system performance.

Figure 4D:
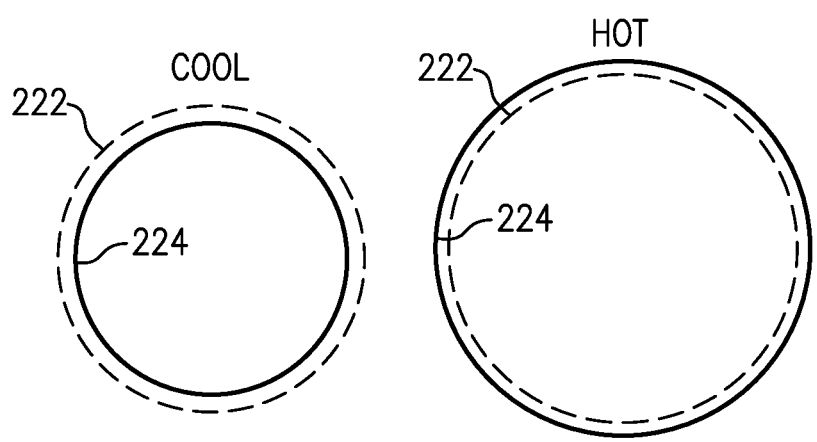
FIG. 4D schematically illustrates an alternate seal configuration according to one of FIGS. 3A-3D in a cool and a hot state.

With reference again to all of FIGS. 3A-3C, FIG. 4D schematically illustrates the relative sizing of the seal rings 222 and the contact surface formed by the interface portion 226 of the seal runner 224 using alternate materials. In the example of FIG. 4D, the thermal expansion of the exemplary seals 200 still results in an interference between a radially outward facing surface of the seal runner 224 and the seal rings 222, but the interference is reduced relative to the interference present in the prior art configurations. The example of FIG. 4D allows you to size the gaps smaller between parts at the cold condition which allows for greater control of oil loss from the bearing compartment and lower air flow amounts than the prior art example of FIG. 4A. In addition, the example of FIG. 4D allows for the achievement of a smaller interference between parts which will enable lower wear and lower resultant flow amounts.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A bearing compartment seal for a gas turbine engine comprising:
   at least one seal ring defining an axis and having a radially inward facing sealing surface;
   a seal runner having a support portion constructed of a first material and an interface portion constructed of a second material distinct from the first material, the interface portion including a radially outward facing surface, the support portion including a radial section having a radially inward facing surface and an axial section extending axially from an end of the radial section, the axial section including a radially outward facing surface contacting the interface portion, the interface portion including a uniform radial thickness along a contact with the seal ring; and
   wherein a first coefficient of thermal expansion of the second material is at most approximately equal to a second coefficient of thermal expansion of the at least one seal ring.

2. The bearing compartment seal of claim 1, wherein the first coefficient of thermal expansion is approximately identical to the second coefficient of thermal expansion.

3. The bearing compartment seal of claim 1, wherein the at least one seal ring is constructed of a third material, and wherein the third material and the second material have at least one shared underlying component material.

4. The bearing compartment seal of claim 3, wherein the third material and the second material are the same material.

5. The bearing compartment seal of claim 1, wherein the at least one seal ring comprises a pair of seal rings.

6. The bearing compartment seal of claim 1, wherein the interface portion is disposed circumferentially about the support portion, and extends at least a full axial length of the at least one seal ring.

7. The bearing compartment seal of claim 6, wherein the interface portion extends a full axial length of the support portion.

8. The bearing compartment seal of claim 6, wherein the support portion extends less than a full axial length of the interface portion.

9. The bearing compartment seal of claim 6, wherein the interface portion extends less than a full length of the support portion.

10. The bearing compartment seal of claim 6, wherein the support portion includes a radially outward extending axial retention tab at at least one axial end of the support portion, the axial retention tab being configured to retain the interface portion axially relative to the support portion.

11. The bearing compartment seal of claim 10, wherein the axial retention tab extends a full radial height of the interface portion.

12. The bearing compartment seal of claim 10, wherein the axial retention tab extends a full circumference of the support portion.

13. The bearing compartment seal of claim 1, wherein the interface portion is retained relative to the support portion at least partially via a fastener.

14. The bearing compartment seal of claim 13, wherein the fastener is disposed between the axial ends of the interface portion.

15. The bearing compartment seal of claim 1, wherein the end of the radial section is opposite the radially inward facing surface.

16. The bearing compartment seal of claim 1, wherein the interface portion includes a uniform radial thickness along an entire axial length of the interface portion.

17. A bearing compartment seal for a gas turbine engine comprising:
   at least one seal ring defining an axis and having a radially inward facing sealing surface;
   a seal runner having a support portion constructed of a first material and an interface portion constructed of a second material distinct from the first material, the interface portion including a radially outward facing surface, the support portion including a radial section having a radially inward facing surface and an axial section extending axially from an end of the radial section, the axial section including a radially outward facing surface contacting the interface portion; and
   wherein a first coefficient of thermal expansion of the second material is at most approximately equal to a second coefficient of thermal expansion of the at least one seal ring; and
   wherein the interface portion is disposed circumferentially about the support portion, and extends at least a full axial length of the at least one seal ring, wherein the support portion includes a radially outward extending axial retention tab at at least one axial end of the support portion, the axial retention tab being circumferentially intermittent and being configured to retain the interface portion axially relative to the support portion.

18. A bearing compartment seal for a gas turbine engine comprising:
- at least one seal ring defining an axis and having a radially inward facing sealing surface;
- a seal runner having a support portion constructed of a first material and an interface portion constructed of a second material distinct from the first material, the interface portion including a radially outward facing surface, the support portion including a radial section having a radially inward facing surface and an axial section extending axially from an end of the radial section, the axial section including a radially outward facing surface contacting the interface portion, the interface portion is retained relative to the support portion at least partially via a fastener, wherein the fastener protrudes through the interface portion and the support portion; and
- wherein a first coefficient of thermal expansion of the second material is at most approximately equal to a second coefficient of thermal expansion of the at least one seal ring.

* * * * *